United States Patent

Mardare et al.

[11] Patent Number: 5,312,871
[45] Date of Patent: May 17, 1994

[54] FREE RADICAL POLYMERIZATION PROCESS

[75] Inventors: Daniela Mardare; Krzysztof A. Matyjaszewski, both of Pittsburgh, Pa.

[73] Assignee: Carnegie Mellon University, Pittsburg, Pa.

[21] Appl. No.: 98,494

[22] Filed: Jul. 27, 1993

[51] Int. Cl.[5] .................... C08F 297/00; C08F 4/52
[52] U.S. Cl. ............................ 525/272; 525/267;
525/276; 525/280; 525/302; 525/308; 525/314;
525/318; 525/323; 525/324; 526/189; 526/190;
526/180; 526/181; 526/183; 526/184; 526/250;
526/255; 526/259; 526/265; 526/298; 526/319;
526/329.7; 526/335; 526/346; 526/343;
526/344; 526/351; 526/352
[58] Field of Search ............... 526/189, 190, 180, 181,
526/183, 184; 525/267, 272

[56] References Cited

U.S. PATENT DOCUMENTS

| 4,124,751 | 11/1978 | Fischer et al. | 526/82 |
| 4,581,429 | 4/1986 | Solomon et al. | 526/220 |

FOREIGN PATENT DOCUMENTS

| 1806940 | 7/1970 | Fed. Rep. of Germany . |
| 49-32669 | 9/1974 | Japan . |

OTHER PUBLICATIONS

O. W. Webster et al. (1983) J. Am. Chem. Soc. 105, 5706–5708 "Group Transfer Polymerization, 1".
M. K. Georges et al. (1993) Macronol. 26, 2987–2988 "Narrow Molecular Wright Resins by a Freo Radical Polymerization Process".
Z. Florjanczyk et al., J. Polym. Sci., Part A, Polym. Chem., 24(8):1849–62 (1986).

Primary Examiner—Joseph L. Schofer
Assistant Examiner—Mark Nagumo

[57] ABSTRACT

This invention concerns a "living" free radical polymerization process for preparing polymers having a narrow distribution of molecular weights.

16 Claims, No Drawings

FREE RADICAL POLYMERIZATION PROCESS

FIELD OF THE INVENTION

This invention concerns a "living" free radical polymerization process useful for the preparation of narrow molecular weight distribution polymers and block copolymers.

TECHNICAL BACKGROUND

U.S. Pat. No. 4,581,429 discloses a free radical polymerization process for suitable unsaturated monomers utilizing an initiator of the structure $(R^1R^2R^3C—)(R^4R^5R^6C—)N—O—X$ where X is a group comprising at least one carbon atom and is such that the free radical X is capable of polymerizing the unsaturated monomer by conventional free radical polymerization, and the radical functionality resides on the or one of the carbon atoms, and the groups $R^1$, $R^2$, $R^5$ and $R^6$ are the same or different straight chain or branched substituted or unsubstituted alkyl groups of a chain length sufficient to provide steric hindrance and weakening of the O—X bond, and $R^3$ and $R^4$ are the same or different straight chain or branched alkyl or substituted alkyl groups or $R^3CNCR^4$ may be part of a cyclic structure which may have fused with it another saturated or aromatic ring. No molecular weight distribution less than 1.6 is reported.

Z. Florjanczyk and M. Siudakiewicz, J. Polym. Sci., Part A, Polym. Chem., 24(8), 1849–62, 1986, disclose the polymerization of vinyl monomers initiated by organoaluminum compounds/benzoyl peroxide systems. The free-radical polymerization of methyl methacrylate, acrylonitrile, vinyl acetate and styrene was initiated by systems comprising benzoyl peroxide and different organoaluminum compounds.

Japanese Patent No. 49032669, 2 Sep. 2, 1974, discloses polymerizing vinyl acetate in the presence of a catalyst system comprising a trialkylaluminum compound, an organic peroxide, and, optionally, zinc chloride. The catalyst was prepared in the presence of the vinyl monomer. Aluminum compounds included triethylaluminum, triisopropylaluminum, triisobutylaluminum and trihexylaluminum. Peroxides included benzoyl peroxide, peroxyoctanoic acid and dicumyl peroxide.

German Patent DE 1806940, Jul, 9, 1970 discloses catalysts for the polymerization of unsaturated monomers. Monomers comprised ethylenic compounds, e.g., ethylene, iso-butyl vinyl ether, acrylonitrile, vinyl acetate, styrene or methyl methacrylate. Catalysts consisted of triethylaluminum, an alkali or alkali earth halide, e.g., zinc chloride, and a gem-polyhalo compound, e.g., $CCl_4$ or $CCl_3CO_2Et$.

SUMMARY OF THE INVENTION

This invention provides a polymerization process for the preparation of narrow molecular weight distribution polymers which comprises contacting under polymerizing conditions a monomer or monomers capable of free radical polymerization of the formula $H_2C=CRX$ or $XRC=CRX$ where R is hydrogen, methyl, chlorine or fluorine and X is acyloxy, carboalkoxy, cyano, aryl, chlorine, fluorine, pyridino, carbazolo or vinyl with an initiator or initiating system comprising an alkyl or aryl metal, a strongly binding monodentate, bidentate or polydentate ligand and a stable oxy free radical.

DETAILED DESCRIPTION OF THE INVENTION

Narrow molecular weight distribution polymers are those which possess a molecular weight distribution, as defined by $M_w/M_n$, (where $M_w$ represents weight average molecular weight and $M_n$ represents number average molecular weight) of approximately 1.01 to 1.6.

By living polymerization is meant a polymerization wherein there is essentially no chain transfer and essentially no chain termination.

Preferred monomer or monomers are vinyl acetate, ethylene, propylene, styrene, vinylidene chloride, vinylidene fluoride, butadiene, methyl acrylate, methyl methacrylate, 4-vinyl pyridine, N-vinyl carbazole, vinyl chloride, vinyl fluoride and tetrafluoroethylene.

The initiator or initiating system comprises an alkyl or aryl metal, a strongly binding monodentate, bidentate or polydentate ligand and a stable oxy free radical. Examples of the alkyl or aryl metal are triisobutyl aluminum, diisobutyl aluminum hydride, dichloro ethyl aluminum, diethyl zinc, butyl lithium, and phenyl magnesium bromide. The strongly binding ligands are exemplified by monodentate - triphenylphosphine; bidentate - bipyridyl or dimethylglyoxime; polydentate - porphyrin. Sometimes, a monomer, such as vinyl pyridine, may play the role of a strongly binding ligand. Examples of stable oxy free radicals are 2,2,6,6-tetramethyl-1-piperidinyloxy (TEMPO), galvinoxyl and the initiators disclosed in U.S. Pat. No. 4,581,429, especially column 3, line 38 to line 68. By stable oxy free radical is meant an oxy free radical that does not initiate polymerization of the monomers by itself (i.e., in the absence of a promoter system).

It is believed that oxygen enters into the reaction as either a catalyst or as a promoter and thus should not be rigorously excluded.

The process of the present invention is especially useful for the preparation of polymers of narrow molecular weight distribution. As the examples indicate, poly(vinyl acetate) having molecular weight distribution of less than 1.5, poly(methyl methacrylate) having molecular weight distribution of less than 1.62 and poly(styrene) having molecular weight distribution of less than 1.3 are made by the described process.

Polymers of this type are especially useful in the preparation of films. The process of the present invention is also useful for the preparation of block copolymers which are useful as compatabilizing agents or dispersing agents.

The process of the present invention is typically carried out in solvent. Solvents are those used for free radical polymerizations, for example benzene, toluene or hexane. Benzene is most preferred.

The process of the present invention is usually carried out at atmospheric pressure, though reduced or elevated pressures, the latter in the case of gaseous monomer(s), may be employed.

The process of the present invention can be operated at any convenient temperature usually in the range of 0° to 100° C.

EXAMPLES

Materials

Triisobutylaluminum, $Al(iBu)_3$, was used as a 1M solution in toluene (Aldrich). 2,2'-Dipyridyl, Dpy, and 2,2,6,6-tetramethyl-1-piperidinyloxy, TEMPO, were used as received (Aldrich). Benzene was refluxed overnight over $CaH_2$ and freshly distilled before use. Vinyl acetate, VAc, was washed with 2% alkali solution to remove a stabilizer, dried over anhydrous $MgSO_4$, and distilled over $CaH_2$.

Preparation of Initiator $Al(iBu)_3$/Dpy/TEMPO

To a 100 mL three-necked round-bottomed flask, equipped with a magnetic stirrer and containing Al-$(iBu)_3$ (1 mmol), was added 1 mL (1M solution in benzene) of DPy (1 mmol) by means of a hypodermic syringe in a dry argon atmosphere. The mixture was stirred for 10 minutes at room temperature. A deep-red colored complex of the type $Al(iBu)_3$:DPy was formed immediately, in a fast, exothermic reaction. Then, 2 mL (1M solution in benzene) of TEMPO (2 mmoles) were added to this complex; a similar exothermic complexation was noticed.

Polymerization

The polymerization solvent (benzene) was introduced via a double-ended needle to a round bottom flask pressured with argon and equipped with a magnetic stirrer and rubber septum. The calculated amount of freshly prepared initiator was syringed into the flask and then the purified monomer was slowly added to the initiator solution. The polymerization reactions were performed in a temperature range of 20°-60° C., during typically 12 to 24 hours. Polymers were precipitated into a large excess of hexane, then filtered and dried under reduced pressure at room temperature.

Measurements

Molecular weights and molecular weight distributions were determined by gel permeation chromatography (GPC), using a Waters 510 HPLC equipped with a 410 differential refractometer and UV detector, using THF as eluent with a flow rate of 1.0 mL $min^{-1}$ and with three ULTRASTYRAGEL columns (100 angstrom, 500 angstrom, and linear) in series. The molecular weight calibration curve was obtained using standard polystyrenes.

Kinetic measurements were performed using dilatometric techniques. All operations involved in the purification of the individual chemicals and in the introducing of the reaction components into the dilatometer were performed in purified argon atmosphere. The reaction components were dosed by syringes in the following order: solvent, initiator, monomer and during dosing the contents of the dilatometer were vigorously stirred. After filling, the dilatometer was closed and placed in a thermostat bath controlled to <0.01° C. The contraction was followed by means of a cathetometer.

EXAMPLE 1

Polymerization of Vinyl Acetate with $Al(iBu)_3$/Dpy/TEMPO

To a solution of $10^{-3}$ moles $Al(iBu)_3$, (1 ml solution 1M in toluene), in 2 mL benzene, were added 0.156 g ($10^{-3}$ moles) 2,2'-dipyridyl (Dpy) and 0.312 g ($2 \times 10^{-3}$ moles) 2,2,6,6-tetramethylpiperidinyloxy (TEMPO), under an Ar atmosphere. Then, 2.5 mL ($2.7 \times 10^{-2}$ moles) vinyl acetate (VAc) were added and the reaction mixture warmed to 60° C. After 24 hours, poly(vinyl acetate) was precipitated in hexane, filtered, dried and weighed. Conversion=81% (1.8 g). Mn, calc=2,350, Mn, GPC=2,146, $M_W/Mn=1.18$.

EXAMPLE 2

Copolymerization of Vinyl Acetate and Methyl Methacrylate (MMA) with $Al(iBu)_3$/Dpy/TEMPO To a solution of $10^{-3}$ moles initiator prepared according to Example 1, were added a 2 mL mixture of the two comonomers, 1 mL MMA ($0.9 \times 10^{-2}$ moles) and 1 mL VAc $1.1 \times 10^{-2}$ moles). The reaction mixture was heated to 60° C. for 24 hours. The copolymer was precipitated in hexane, filtered, dried and weighed. Conversion=92% (1.85 g). Mn, calc=1,800, Mn, GPC=2,350, $M_W/M_n=1.23$.

EXAMPLE 3

Polymerization of Vinyl Acetate with $AlEtCl_2$/Dpy/TEMPO

To a benzene solution (2 mL) of $10^{-3}$ moles $AlEtCl_2$ (0.55 mL solution 1.8M in toluene) was added 0.156 g ($10^{-3}$ moles) DPy and 0.312 g ($2 \times 10^{-3}$ moles) TEMPO, under an Ar atmosphere, at room temperature. Then, 2.5 mL ($2.7 \times 10^{-2}$ moles) of VAc freshly distilled was added dropwise, under stirring, to the initiator solution. After 24 hours, poly(vinyl acetate), PVAc, was precipitated in hexane, filtered, dried and weighed. Conversion=65% (1.46 g). $M_n$, calc=2,350, Mn, GPC=150,400, $M_W/M_n=1.3$.

EXAMPLE 4

Polymerization of Vinyl Acetate with $Al(iBu)_2H$/Dpy/TEMPO

To a solution of $10^{-3}$ moles $Al(iBu)_2H$ (1 mL solution 1M in toluene) in 2 mL benzene was added 0.156 g ($10^{-3}$ moles) DPy and 0.312 g ($2 \times 10^{-3}$ moles) TEMPO, under argon, at 25° C. Then, 2.5 mL ($2.7 \times 10^{-2}$ moles) of VAc were added dropwise, under stirring. After 24 hours, PVAc was precipitated in hexane, filtered, dried and weighed. Conversion=61% (1.37 g). Mn, calc=2,350, Mn, GPC=24,686, $M_W/M_n=1.5$.

EXAMPLE 5

Polymerization of Styrene with $Al(iBu)_3$/dimethylglyoxime/TEMPO

To a solution of $10^{-3}$ moles $Al(iBu)_3$ (1 mL solution 1M in toluene), in 2 mL benzene, was added $10^{-3}$ moles (0.116 g) dimethylglyoxime and 0.312 g ($2 \times 10^{-3}$ moles) TEMPO, under argon, at 25° C. Then, 3 mL ($2.6 \times 10^{-2}$ moles) styrene freshly distilled was added dropwise, at room temperature. After 12 hours, the reaction mixture was precipitated in methanol, filtered, dried and weighed. Conversion=86% (2.8 g). Mn, calc=2,700, Mn, GPC=14,400, $M_W/M_n=1.24$.

EXAMPLE 6

Polymerization of MMA with $Al(iBu)_3$/Dpy/TEMPO

To an initiator solution prepared according to Example 1, was added dropwise 8 mL ($7.5 \times 10^{-2}$ moles) of MMA freshly distilled. An exothermic reaction occurred instantaneously (T=20° C.) and after 30 minutes, poly(methyl methacrylate) was precipitated in hexane, filtered, dried and weighed. Conversion=95% (7.6 g). $M_n$, calc=8,000, Mn, GPC=12,460, $M_W/M_n=1.24$.

EXAMPLE 7

Polymerization of MMA with Al(iBu)$_3$/Dpy/galvinoxyl

To a solution of $10^{-3}$ moles complex Al(iBu)$_3$/Dpy prepared according to Example 1, were added $10^{-3}$ moles (0.422 g) galvinoxyl, under argon, at 25° C. Then, 5 mL ($4.7 \times 10^{-2}$ moles) of MMA were added dropwise to the initiator solution just prepared. After 5 hours, PMMA was precipitated in hexane, filtered, dried and weighed. Conversion=74% (3.72 g). Mn, calc=5,000, Mn, GPC=13,480, Mw/Mn=1.62.

EXAMPLE 8

Polymerization of Methyl Acrylate with Al(iBu)$_3$/Dpy/TEMPO

To an initiator solution prepared according to Example 1, were added 5 mL ($5.6 \times 10^{-2}$ moles) of methyl acrylate. An exothermic reaction occurred within 5 minutes (T=15° C.). After 2 hours, poly(methyl acrylate) was precipitated in hexane, filtered, dried and weighed. Conversion=81%, (4.24 g). Mn, calc=4,800, Mn, GPC=10,480, M$w$/Mn=1.30.

EXAMPLE 9

Polymerization of 4-Vinyl pyridine (4-VP) with Al(iBu)$_3$/Dpy/TEMPO

To a solution of initiator prepared according to Example 1, were added 5 mL ($4.6 \times 10^{-2}$ moles) of 4-VP freshly distilled. After 4 hours, poly(4-VP) was precipitated in hexane, filtered, dried and weighed. Conversion=76% (3.8 g).

EXAMPLE 10

Polymerization of N-Vinyl carbazole (NVC) with Al(iBu)$_3$/Dpy/TEMPO

To a solution of initiator prepared according to Example 1, were added 5 g ($2.6 \times 10^{-2}$ moles) NVC and the reaction mixture was heated to 60° C. After 5 hours, poly(NVC) was precipitated in hexane, filtered, dried and weighed. Conversion=52% (2.6 g)

EXAMPLE 11

Polymerization of MMA with ZnEt$_2$/Dpy/TEMPO

To a solution of $10^{-3}$ moles (1 mL solution 1M ZnEt$_2$ in toluene), in 5 mL benzene, were added 0.156 g ($10^{-3}$ moles) Dpy and 0.312 g ($2 \times 10^{-3}$ moles) TEMPO. Then, 5 mL ($4.7 \times 10^{-2}$ moles) MMA freshly distilled were added dropwise, at room temperature. The reaction mixture was heated to 40° C. After 10 hours, PMMA was precipitated in hexane, filtered, dried and weighed. Conversion=74% (3.6 g). Mn, calc=4,700, Mn, GPC=31,460, M$w$/M$n$=1.26.

EXAMPLE 12

Polymerization of 4-VP with n-BuLi/TEMPO

To a THF solution of $10^{-3}$ moles of n-BuLi (0.4 mL, 2.5M solution in hexane) were added 0.188 g ($1.2 \times 10^{-3}$ moles) TEMPO, under Ar atmosphere. An exothermic reaction occurred during next 3 minutes. Then, 3 mL ($2.8 \times 10^{-2}$ moles) 4-VP freshly distilled were added. After 2 hours, poly(4-VP) was precipitated in hexane, filtered, dried and weighed. Conversion=70% (2 g). Mn, calc=2,970, Mn, GPC=2,560; M$w$/M$n$=1.30.

EXAMPLE 13

Polymerization of 4-VP with PhMoBr/TEMPO

To a THF solution of $10^{-3}$ moles PhMgBr (1 mL 1M solution in THF) were added 0.188 g ($1.2 \times 10^{-2}$ moles) TEMPO, under stirring, in Ar atmosphere. An exothermic reaction occurred in several minutes. Then, 3 mL ($2.82 \times 10^{-2}$ moles) 4-VP freshly distilled were added. After 3 hours, poly(4-VP) was precipitated in hexane, filtered, dried and weighed. Conversion=72% (2.1 g). Mn, calc=2,970, Mn, GPC=3,670; M$w$/M$n$=1.19.

EXAMPLE 14

Polymerization of Vinyl Acetate with Al(iBu)$_3$/Ph$_3$P/TEMPO

To a solution of $10^{-3}$ moles Al(iBu)$_3$, (1 ml solution 1M in toluene) in 2 mL benzene, were added 0.262 g ($10^{-3}$ moles) triphenylphosphine (Ph$_3$P) and 0.312 g ($2 \times 10^{-3}$ moles) 2,2,6,6-tetramethylpiperidinyloxy (TEMPO), under an Ar atmosphere. Then, 2.5 mL ($2.7 \times 10^{-2}$ moles) vinyl acetate (VAc) were added and the reaction mixture warmed to 60° C. After 24 hours, poly(vinyl acetate) was precipitated in hexane, filtered, dried and weighed. Conversion=61%. Mn, calc=2,350, Mn, GPC=6,860, M$w$/Mn=1.48.

EXAMPLE 15

Polymerization of MMA with TPPAlMe/TEMPO

To a solution of 0.614 g ($10^{-3}$ moles) 5,10,15,20-tetraphenyl-21H, 23H-porphine (TPPH$_2$) in 20 ml of dichloromethane were added $10^{-3}$ moles.(0.5 ml 2M solution in toluene) trimethylaluminum, and the mixture was stirred two hours at 40° C. Then, the dichloromethane was evaporated and the remaining methyl aluminumporphyrin (TPPAlMe) was dissolved in benzene. To this solution 0.156 g ($10^{-3}$ moles) 2,2,6,6-tetramethylpiperidinyloxy (TEMPO) were, added with agitation. Then, 5 mL ($4.7 \times 10^{-2}$ moles) methyl methacrylate freshly distilled were added and the reaction mixture was warmed to 40° C. After 3 hours, poly(methyl methacrylate) was precipitated in hexane, filtered, dried and weighed. Conversion=72%. Mn, calc=5,000, Mn, GPC=11,400, M$w$/Mn =1.37.

What is claimed is:

1. A "living" polymerization process for the preparation of narrow molecular weight distribution polymers which comprises:

contacting under polymerizing conditions a monomer or monomers capable of free radical polymerization of the formula H$_2$C=CRX or XRC=CRX, where R is hydrogen, methyl, chlorine, or fluorine and X is selected from the group consisting of acyloxy, carboalkoxy, cyano, aryl, chlorine, fluorine, pyridino, carbazolo and vinyl, with an initiator or initiating system comprising an alkyl or aryl metal, a strongly binding monodentate, bidentate or polydentate ligand and a stable oxy free radical, optionally in the presence of a catalytic amount of oxygen.

2. The process as defined by claim 1 wherein the monomer is selected from the group consisting of vinyl acetate, ethylene, propylene, styrene, vinylidene chloride, vinylidene fluoride, butadiene, methyl acrylate, methyl methacrylate, 4-vinyl pyridine, N-vinyl carbazole, vinyl chloride, vinyl fluoride and tetrafluoroethylene.

3. The process of claim 1 wherein the alkyl or aryl metal, is selected from the group consisting of triisobutyl aluminum, diisobutyl aluminum hydride, dichloroethyl aluminum, diethyl zinc, butyl lithium and phenyl magnesium bromide.

4. The process of claim 1 wherein the monodentate ligand is phenylphosphine.

5. The process of claim 1 wherein the bidentate ligand is bipyridyl or dimethylglyoxime.

6. The process of claim 1 wherein the polydentate ligand is a porphyrin.

7. The process of claim 1 wherein the oxy free radical is 2,2,6,6-tetramethyl-1-piperidinyloxy or galvinoxyl.

8. The process of claim 1 conducted in the presence of a solvent.

9. The process of claim 8 wherein the solvent is selected from benzene, toluene, and hexane.

10. The process of claim 1 carried out at about atmospheric pressure.

11. The process of claim 1 carried out above atmospheric pressure.

12. The process of claim 1 carried out between 0° C. and 100° C.

13. The process of claim 1 conducted in the presence of a catalytic amount of oxygen.

14. A "living" polymerization process for the preparation of narrow molecular weight distribution block co-polymers which comprises:

(a) contacting under polymerizing conditions a monomer or monomers capable of free radical polymerization of the formula $H_2C=CRX$ or $XRC=CRX$, where R is hydrogen, methyl, chlorine or fluorine and X is selected from the group consisting of acyloxy, carboalkoxy, cyano, aryl, chlorine, fluorine, pyridino, carbazolo and vinyl, with an initiator or initiating system comprising an alkyl or aryl metal, a strongly binding monodentate, bidentate or polydentate ligand and a stable oxy free radical; and (b) contacting the product of step (a) with a second monomer selected from monomer or monomers capable of free radical polymerization of the formula $H_2C=CRX$ or $XRC=CRX$, where R is hydrogen, methyl, chlorine or fluorine and X is selected from the group consisting if acyloxy, carboalkoxy, cyano, aryl, chlorine, fluorine, pyridino, carbazolo and vinyl, provided that the monomer of step (a) is different from the monomer used in step (b).

15. The process as defined by claim 14 wherein the monomer in step (a) and step (b) is selected from the group consisting of vinyl acetate, ethylene, propylene, styrene, vinylidene chloride, vinylidene fluoride, butadiene, methyl acrylate, methyl methacrylate, 4-vinyl pyridine, N-vinyl carbazole, vinyl chloride, vinyl fluoride and tetrafluoroethylene.

16. The process of claim 14 wherein the alkyl or metal, is selected from the group consisting of triisobutyl aluminum, diisobutyl aluminum hydride, dichloroethyl aluminum, diethyl zinc, butyl lithium and phenyl magnesium bromide.

* * * * *